(12) United States Patent
Kinney et al.

(10) Patent No.: US 11,659,782 B2
(45) Date of Patent: May 30, 2023

(54) WALKING TRACK SYSTEM OF AN AGRICULTURAL IMPLEMENT

(71) Applicant: DEERE & COMPANY, Moline, IL (US)

(72) Inventors: Colter W. Kinney, Lohrville, IA (US);
Randall A. Maro, Davenport, IA (US);
Grant J. Wonderlich, Milan, IL (US);
Nathan A. Mariman, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 281 days.

(21) Appl. No.: 16/838,260

(22) Filed: Apr. 2, 2020

(65) Prior Publication Data

US 2021/0307229 A1 Oct. 7, 2021

(51) Int. Cl.
*A01B 63/22* (2006.01)
*A01B 63/00* (2006.01)

(52) U.S. Cl.
CPC ............ *A01B 63/22* (2013.01); *A01B 63/002* (2013.01)

(58) Field of Classification Search
CPC .............................. A01B 63/22; A01B 63/002
See application file for complete search history.

(56) References Cited

U.S. PATENT DOCUMENTS

| | | | | |
|---|---|---|---|---|
| 3,583,284 A * | 6/1971 | Ryan | ...................... | A01B 39/19 60/426 |
| 4,967,851 A * | 11/1990 | Barber | ................... | A01B 63/22 280/43.23 |
| 5,065,681 A * | 11/1991 | Hadley | ................ | A01B 63/114 111/55 |
| 6,068,064 A | 5/2000 | Bettin et al. | | |
| 6,302,220 B1 | 10/2001 | Mayerle et al. | | |
| 6,758,284 B2 * | 7/2004 | Myers | .................... | A01B 51/04 172/388 |
| 7,918,285 B1 * | 4/2011 | Graham et al. | .... | A01B 63/1006 172/452 |
| 9,883,623 B2 | 2/2018 | Koch et al. | | |
| 2018/0153089 A1 * | 6/2018 | Sporrer et al. | ......... | A01B 63/32 |
| 2020/0137942 A1 | 5/2020 | Koch et al. | | |

OTHER PUBLICATIONS

Extended European Search Report and Written Opinion issued in European Patent Application No. 21162273.3, dated Aug. 10, 2021, in 7 pages.

* cited by examiner

*Primary Examiner* — Tara Mayo
(74) *Attorney, Agent, or Firm* — Taft Stettinius & Hollister LLP; Stephen F. Rost

(57) ABSTRACT

A control system for controlling an implement that is movable between a work mode and a transport mode. The control system includes a source of hydraulic fluid, a first actuator and a second actuator. The first and second actuators are fluidly coupled to the source and disposed parallel to one another. A sensor detects movement of the first and second actuators between their retracted and fully extended positions, and a control valve is disposed in communication with the sensor and in fluid communication with the first and second actuators. As the implement moves to its transport mode, the sensor detects movement of the first and second actuators towards their fully extended positions. The control valve inhibits movement of the first and second actuators before either actuator reaches its fully extended position.

20 Claims, 5 Drawing Sheets

WALKING TRACK SYSTEM OF AN AGRICULTURAL IMPLEMENT

FIELD OF THE DISCLOSURE

The present disclosure relates to an agricultural implement, and in particular, to an agricultural implement having a control system for controlling actuators for raising or lower the implement during operation.

BACKGROUND

On an agricultural implement, there are certain design limitations that inhibit the amount of commodity capacity or weight in which the implement is able to transport. This is particularly true with wheels which support a frame or chassis of the implement and traverse along the ground during operation. However, as fields and farming operations grow in size, larger and heavier equipment is often required to complete certain jobs during the correct window in the growing season. Planting, in particular, is one of those operations. Larger and, in many cases, heavier planters are required to accomplish this task, but heavier planters lead to increased compaction around the wheels.

There is a need for a control system to better control or distribute weight across the implement or machine to allow for greater amounts of commodity or weight to be transported.

SUMMARY

In one embodiment of the present disclosure, a control system is provided for controlling an implement that is movable between a work mode and a transport mode. The control system includes a source of hydraulic fluid; a first actuator fluidly coupled to the source, the first actuator being movable between a retracted position and a fully extended position; a second actuator fluidly coupled to the source and in parallel with the first actuator, the second actuator being movable between a retracted position and a fully extended position; a sensor for detecting movement of the first and second actuators between their retracted and fully extended positions; and a control valve disposed in communication with the sensor and in fluid communication with the first and second actuators; wherein, as the implement moves to its transport mode, the sensor detects movement of the first and second actuators towards their fully extended positions; wherein, the control valve inhibits movement of the first and second actuators before either actuator reaches its fully extended position.

In one example of this embodiment, the first actuator comprises a cap end and a rod end; the second actuator comprises a cap end and a rod end; wherein, the cap ends of the first and second actuators are directly fluidly coupled, and the rod ends of the first and second actuators are directly fluidly coupled. In a second example, the sensor comprises a proximity sensor for detecting a target on the implement as the first and second actuators move towards their fully extended positions. In a third example, as the proximity sensor detects the target, an output signal is sent to trigger the control valve to block fluid therethrough and inhibit movement of the first and second actuators. In a fourth example, in the transport mode, the first and second actuators are disposed at a threshold extended position which is less than their fully extended positions; further wherein, during transport mode, hydraulic fluid flows between the first and second actuators such that the first or second actuator extends as the other retracts.

In a fifth example, the control system further includes a third actuator fluidly coupled to the source, the third actuator being movable between a retracted position and a fully extended position; a fourth actuator fluidly coupled to the source and in parallel with the third actuator, the fourth actuator being movable between a retracted position and a fully extended position; a second sensor for detecting movement of the third and fourth actuators between their retracted and fully extended positions; and a second control valve disposed in communication with the second sensor and in fluid communication with the third and fourth actuators; wherein, as the implement moves to its transport mode, the second sensor detects movement of the third and fourth actuators towards their fully extended positions; wherein, the second control valve inhibits movement of the third and fourth actuators before either actuator reaches its fully extended position.

In another example, the first and second actuators form a first actuator pair and the third and fourth actuators form a second actuator pair, the first actuator pair and second actuator pair being independently fluidly coupled to the source. In a further example, the control system includes a flow divider fluidly coupled between the source and the first and second actuator pairs, the flow divider dividing an amount of fluid from the source into substantially equal first and second portions, the first portion of fluid flowing to the first actuator pair and the second portion of fluid flowing to the second actuator pair.

In another embodiment of the present disclosure, a control system for controlling an implement having a chassis that is movable between a work mode and a transport mode, the control system comprising a controller comprising control logic for controlling the control system, the control logic including a predefined target height; a source of hydraulic fluid; a first actuator fluidly coupled to the source, the first actuator being movable between a retracted position and a fully extended position; a second actuator fluidly coupled to the source and in parallel with the first actuator, the second actuator being movable between a retracted position and a fully extended position; a sensor for detecting a change in height of the chassis as the first and second actuators move between their retracted and fully extended positions, the sensor being in communication with the controller; and a control valve disposed in communication with the controller and in fluid communication with the first and second actuators; wherein, as the implement moves to its transport mode, the sensor detects a height of the chassis relative to a ground surface and outputs the detected height to the controller; wherein, the controller uses the control logic to compare the detected height to the predefined target height; wherein, when the height of the chassis reaches the predefined target height, the controller triggers the control valve to inhibit movement of the first and second actuators before either actuator reaches its fully extended position.

In one example of the present embodiment, the first actuator comprises a cap end and a rod end; the second actuator comprises a cap end and a rod end; wherein, the cap ends of the first and second actuators are directly fluidly coupled, and the rod ends of the first and second actuators are directly fluidly coupled. In a second example, in the transport mode, the first and second actuators are disposed at a target extended position which is less than their fully extended positions; further wherein, during transport mode, hydraulic fluid flows between the first and second actuators such that the first or second actuator extends as the other retracts. In a third example, a third actuator fluidly coupled to the source, the third actuator being movable between a retracted position and a fully extended position; a fourth actuator fluidly coupled to the source and in parallel with the third actuator, the fourth actuator being movable between a retracted position and a fully extended position; a second sensor for detecting a change in height of the chassis as the third and fourth actuators move between their retracted and fully extended positions, the second sensor being in communication with the controller; and a second control valve disposed in communication with the controller and in fluid communication with the first and second actuators; wherein, as the implement moves to its transport mode, the second sensor detects the height of the chassis relative to the ground surface and outputs the detected height to the controller; wherein, the controller uses the control logic to compare the detected height to the predefined target height; wherein, when the height of the chassis reaches the predefined target height, the controller triggers the second control valve to inhibit movement of the third and fourth actuators before either actuator reaches its fully extended position.

In a fourth example, the first and second actuators form a first actuator pair and the third and fourth actuators form a second actuator pair, the first actuator pair and second actuator pair being independently fluidly coupled to the source. In a fifth example, the control system includes a flow divider fluidly coupled between the source and the first and second actuator pairs, the flow divider dividing an amount of fluid from the source into substantially equal first and second portions, the first portion of fluid flowing to the first actuator pair and the second portion of fluid flowing to the second actuator pair. In another example, the control system includes a selective control valve fluidly coupled to the first and second actuators, the selective control valve supplying fluid to the first and second actuators; wherein, when the height of the chassis reaches the predefined target height, the controller triggers the selective control valve to discontinue supplying fluid to the first and second actuators and inhibit movement of the first and second actuators before either actuator reaches its fully extended position.

In a further embodiment of the present disclosure, an agricultural implement configured to operate in at least a work mode and a transport mode as it traverses along a ground surface, the implement comprising a chassis; a first ground-engaging mechanism and a second ground-engaging mechanism coupled to the chassis; a source of hydraulic fluid; a first actuator fluidly coupled to the source and being movable between a retracted position and a fully extended position, the first actuator configured to move the first ground-engaging mechanism between a lowered position and raised position; a second actuator fluidly coupled to the source and in parallel with the first actuator, the second actuator being movable between a retracted position and a fully extended position, where the second actuator is configured to move the second ground-engaging mechanism between a lowered position and raised position; a sensor for detecting a height of the chassis relative to the ground surface or movement of the first and second actuators; a control valve fluidly coupled with the first and second actuators; wherein, as the implement moves to its transport mode, the sensor detects the height of the chassis or movement of the first and second actuators towards their fully extended positions; wherein, the control valve inhibits movement of the first and second actuators before either actuator reaches its fully extended position.

In one example of this embodiment, in the transport mode, the first and second actuators are disposed at a target extended position which is less than their fully extended positions; further wherein in transport mode, as the first ground-engaging mechanism raises, the first actuator extends such that hydraulic fluid flows from the second actuator to the first actuator inducing the second actuator to retract; and in transport mode, as the second ground-engaging mechanism raises, the second actuator extends such that hydraulic fluid flows from the first actuator to the second actuator inducing the first actuator to retract. In a second example, the first actuator comprises a cap end and a rod end; the second actuator comprises a cap end and a rod end; wherein, the cap ends of the first and second actuators are directly fluidly coupled, and the rod ends of the first and second actuators are directly fluidly coupled.

In another example, a selective control valve is located on a towing vehicle and is fluidly coupled between the source and the first and second actuators, wherein the selective control valve supplies hydraulic fluid from the source to the first and second actuators when in its open position; further wherein, the selective control valve moved to its closed position when the sensor detects the chassis height or the positions of the actuators reaches a target to further inhibit movement of the first and second actuators before either actuator reaches its fully extended position. In a further example, the implement includes a third actuator fluidly coupled to the source, the third actuator being movable between a retracted position and a fully extended position; a fourth actuator fluidly coupled to the source and in parallel with the third actuator, the fourth actuator being movable between a retracted position and a fully extended position; wherein the first and second actuators form a first actuator pair and the third and fourth actuators form a second actuator pair, the first actuator pair and second actuator pair being independently fluidly coupled to the source.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
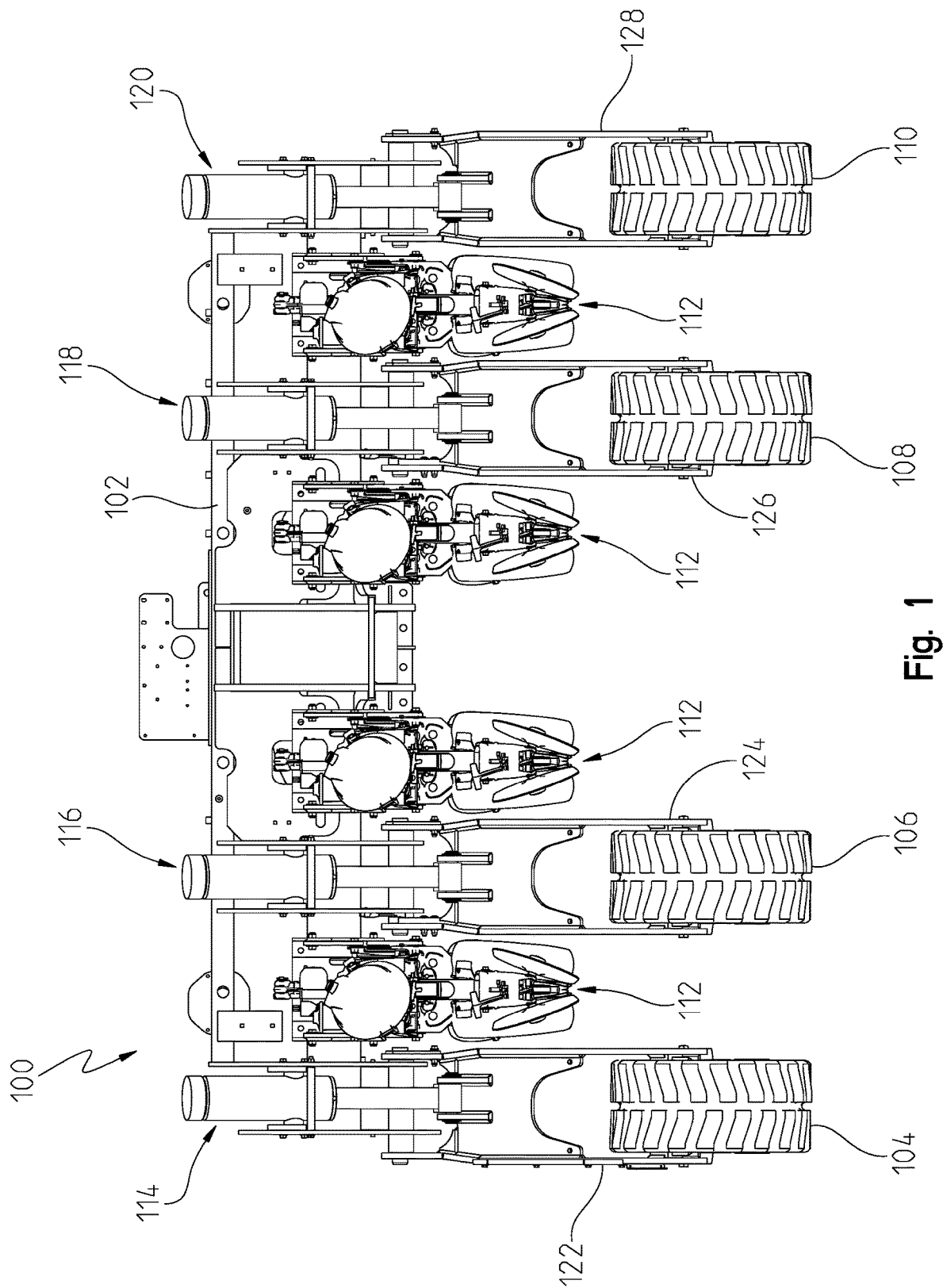
FIG. 1 is a view of an implement with a plurality of wheel and working tools.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

As described above, with agricultural implements, such as planters, it is desirable to be able to carry as much commodity as possible as it reduces downtime awaiting for a refill of commodity. As implements are designed to carry more commodity, this often increases the amount of overall weight of the implement. Moreover, as additional commodity is carried by the implement, it increases the amount of soil compaction by the implement as it traverses a field. Soil compaction, as known to those skilled in the art, is undesirable for planting as it can reduce yields.

In order to reduce soil compaction, some implements can be designed with tracks rather than wheels. Tracks can often alleviate compaction issues by distributing the load or weight on a larger footprint, and they tend to work well in the field. Even so, tracks have limitations as well, particularly on roads where the tracks are unable to support the same loads and speeds as tires or wheels.

Agricultural implements such as planters are designed to operate in at least two configurations, i.e., a work or planting configuration and a transport configuration. In the transport configuration, outer wing assemblies of the implement are generally folded in an upright orientation to allow the implement to traverse narrow roadways. Moreover, the implement toolbar may be rotated (e.g., by 90°) during transport. During road operation, however, many conventional planter implements with tracks require the implement to be transported with no seed or fertilizer in the tanks and at a speed which is lower than most customers desire.

When operating in transport mode and traveling along a road, it is desirable to distribute loads and weight across the width of the implement so that each track is supporting an even amount of weight. By doing so, this can increase the operating life of the track. However, most roads tend to be crowned such that at their centerline the road is at a peak to allow water to more easily drain from the surface. In some cases, roads can be crowned by up to 5°. The crown in the road, however, can prevent tracks from contacting the ground evenly if there are more than two tracks. The tracks closest to the centerline tend to carry more of the load than those tracks located further away from the centerline. This un-even loading can often overload the tracks closest to the center of the planter, which further results in excessive heat generation and possible damage to the track. In some conventional planters, this is mitigated by limiting the vertical load applied to the track (i.e., the weight of the implement) and the transport speed along a road surface.

Thus, in the present disclosure, a control system is provided to ensure all tracks contact the ground at all times. In FIG. 1, for example, an agricultural implement 100 in the form of a planter is shown. While the present disclosure refers to a planter, it is to be understood that the control system described herein may apply to other agricultural implements. Moreover, the present disclosure applies to those implements which utilize both tracks and wheels.

The implement 100 in FIG. 1 may include a chassis or frame 102 which is supported by a first wheel 104, a second wheel 106, a third wheel 108, and a fourth wheel 110. While wheels are shown in this embodiment, it is understood the wheels may be replaced with tracks. A plurality of work tools 112 for performing a work function such as planting may be coupled to the chassis 102.

The wheels may be adjustably controlled to raise or lower based on changes in the underlying terrain. This may be done by hydraulic lift actuators, as shown in FIG. 1. The actuators may be hydraulic, electric, electro-hydraulic, pneumatic, mechanical, or any other known type of actuator. As shown, the implement 100 may include a first actuator 114, a second actuator 116, a third actuator 118, and a fourth actuator 120. The first actuator 114 may control movement of the first wheel 104, the second actuator 116 may control movement of the second wheel 106, the third actuator 118 may control movement of the third wheel 108, and the fourth actuator 120 may control movement of the fourth wheel 110. At least two of the actuators are in fluid communication with one another, as described below.

Each wheel may be coupled to the chassis or frame 102 via a wheel arm. The first wheel 104 may be coupled to the chassis 102 via a first wheel arm 122. The second wheel 106 may be coupled to the chassis 102 via a second wheel arm 124. The third wheel 108 may be coupled to the chassis 102 via a third wheel arm 126, and the fourth wheel 110 may be coupled to the chassis 102 via a fourth wheel arm 128.

Figure 2:
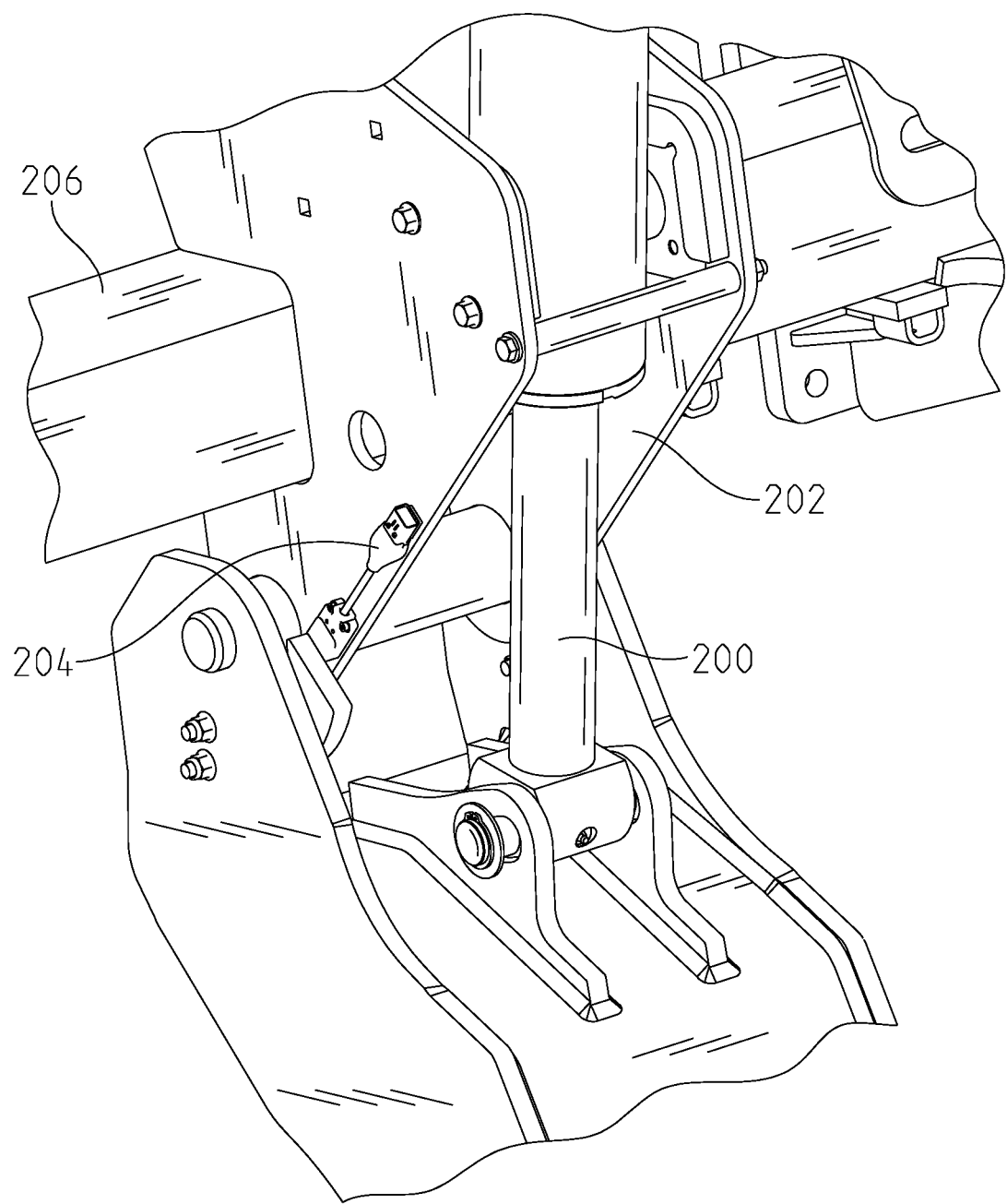
FIG. 2 is a perspective view of a lift cylinder and chassis of an agricultural implement.

Referring to FIG. 2, an example of a lift actuator and wheel arm is shown. Here, a lift actuator for raising or lowering the machine at the location of the track or wheel is shown. The lift actuator may include a rod 200 as shown. As the rod 200 extends, the machine may be raised, and as the rod 200 retracts, the machine may be lowered. As the rod 200 extends and retracts, a wheel arm 202 moves relative to a chassis 206 of the implement. A sensor 204 may be used to detect movement of the wheel arm 202. In this case, the sensor 204 may be a proximity sensor. Alternatively, the sensor 204 may be a height sensor capable of detecting a position of the chassis relative to the ground. The sensor 204 may also be a position sensor used to detect a position of the actuator, where the sensor 204 is located inside the actuator. Alternatively, the sensor 204 can measure ground height defined between the chassis and the ground. Further, the sensor 204 may detect ground height from a wheel module. Moreover, the sensor 204 may detect an angular position between the lift arm and chassis. In other words, if ground height can be detected by the sensor 204, this can be correlated to a position of the chassis 206 relative to the ground.

In the present disclosure, the control system for controlling or evenly distributing weight across the tracks (or wheels) to better support the implement and provide for even track life is disclosed. As described above, each track or wheel can be controlled by a single actuator. However, in other embodiments, there may be two or more actuators for each track or wheel. The lift actuators can be hydraulically controlled in pairs and in parallel. By doing so, the actuators may be controlled in a manner to allow each to float or walk. This can be accomplished until a cap end pressure on each actuator in the parallel pair is equal.

In order for this to happen, a small amount of fluid may be transferred from the cap end of one actuator to the other, thereby extending one actuator and retracting the other. To ensure the actuators are able to float or walk, the control system operably controls the respective actuator for lowering the implement is unable to reach its fully extended position as the implement is raised to the road transport configuration or mode. By not fully extending the actuators, there is an amount of available stroke remaining to allow the floating or walking feature between the actuator pairs.

As the implement traverses over different terrain, the tracks or wheels are allowed to float or walk to better distribute loads. As the tracks or wheels float or walk, one of the actuator pairs extends as the other retracts. The control system can be designed to include threshold or stop provisions by which the actuators are inhibited from reaching their fully raised position. In a software solution, a controller may include control logic or software with predefined threshold or stopping points whereby the actuators are limited from extending beyond the threshold. The threshold may be predefined at a position less than a maximum extension position. Further, the threshold may be adjustable in order to vary the levels in which the actuators can float or walk.

Figure 5:
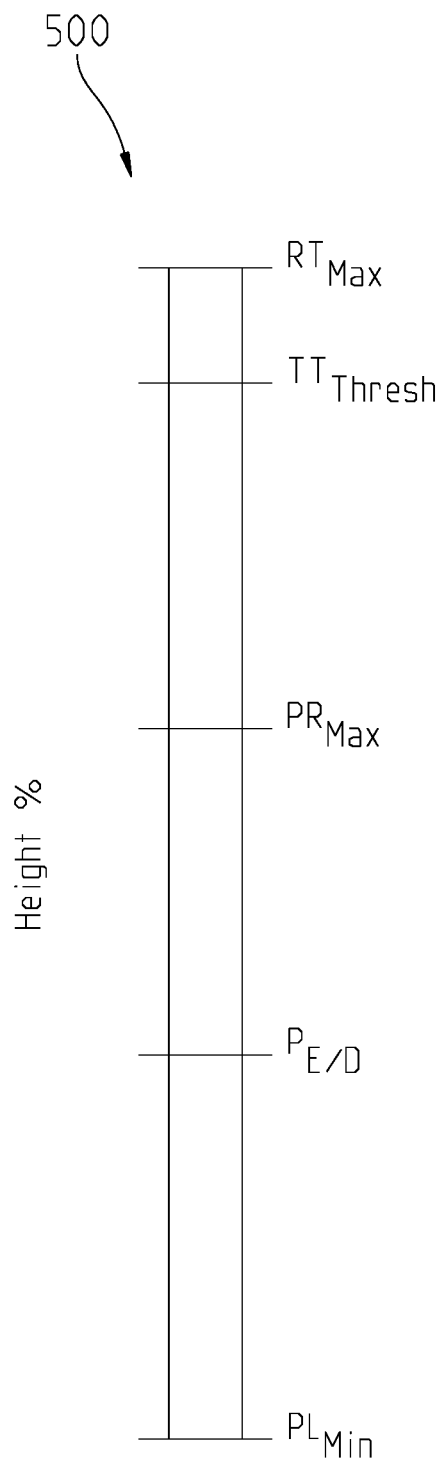
FIG. 5 is a chart of thresholds for controlling lift cylinders for distributing weight across an agricultural implement.

For example, in FIG. 5, a chart is shown for a given lift actuator. The actuator may have a plurality of defined positions including a maximum road transport position, $RT_{MAX}$, where the actuator is at its fully extended position during transport mode. The actuator may include a maximum raised position, $PR_{MAX}$, and a minimum lowered position, $PL_{MIN}$, during a field or planting mode. The position PE/D may also be a position in which the planter is enabled or disabled. The actuator may be operably controlled to a track transport threshold, $TT_{Thresh}$, where the actuator is not at its fully extended position but rather is at a percentage of its maximum extended position. For example, the actuator may be at approximately 75% of its fully extended position. In another example, the actuator may be at approximately 80% of its fully extended position. In a further example, the actuator may be at approximately 85% of its fully extended position. In yet another example, the actuator may be at approximately 90% of its fully extended position. In yet a further example, the actuator may be at approximately 95% of its fully extended position. In any event, the actuator is not fully extended at this threshold position, and flow to the actuator is stopped to prevent the actuator from extending beyond this threshold position to allow the actuator to float or walk as the implement encounters uneven terrain.

Thus, as the implement is configured in its transport position and is travelling down the road, each lift actuator may be monitored based on its position relative to the track transport threshold. As each actuator extends towards the threshold, the amount of fluid provided to extend the actuator may be slowed or discontinued in order to prevent the actuator from extending past the threshold position. Moreover, as the implement traverses along different terrain, one of the actuators in a parallel pair may receive additional fluid to extend, thereby raising the machine, while the other actuator in the parallel pair receives less fluid such that it retracts. In this arrangement, the amount of load on each track can be distributed more evenly.

Figure 3:
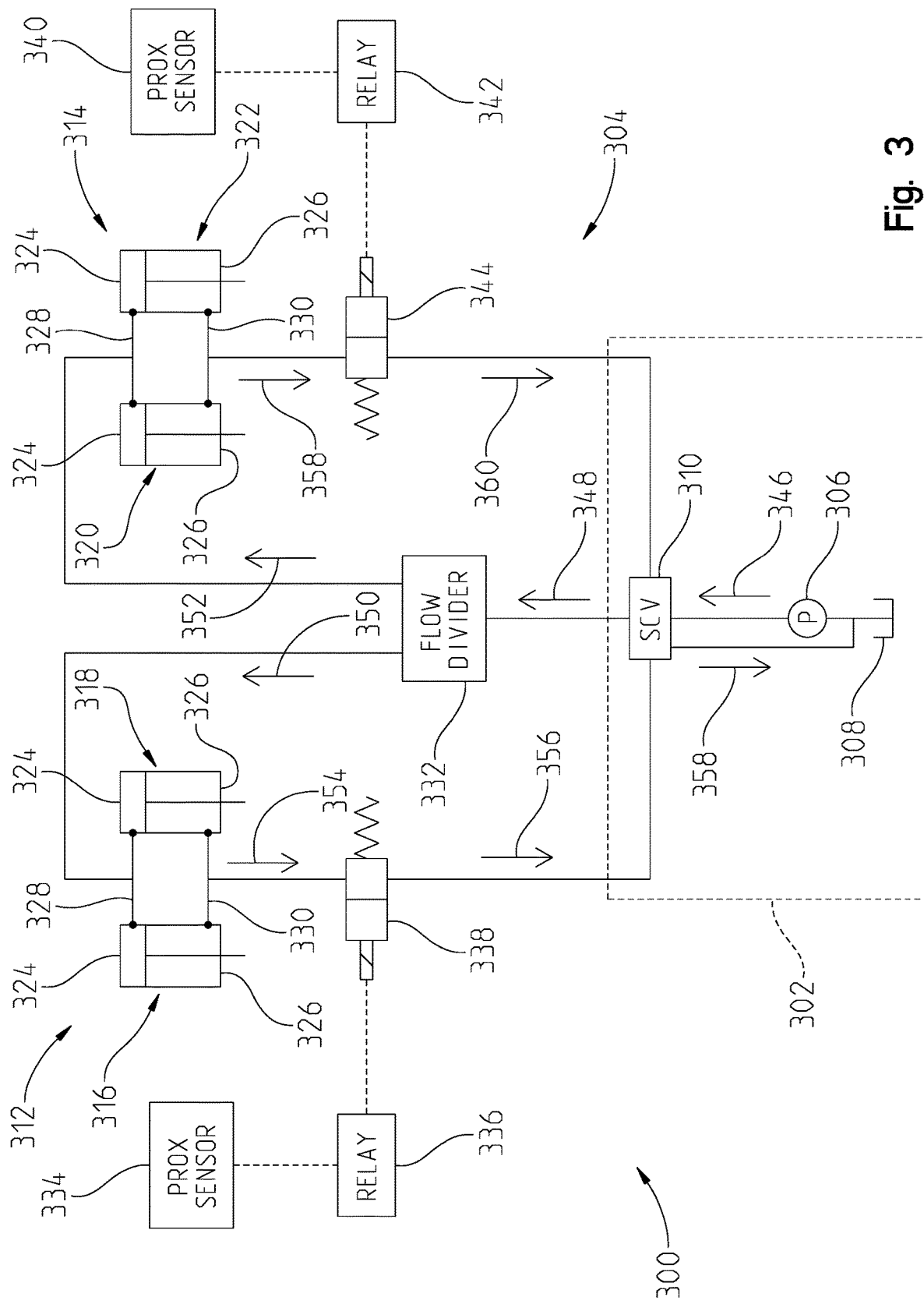
FIG. 3 is a schematic of a first control system for distributing weight across an agricultural implement.

To better understand the control system of the present disclosure, reference is made to a first embodiment depicted in FIG. 3. Here, a control system 300 may include a first portion located on a tractor 302 or towing vehicle and a second portion located on an agricultural implement 304. The tractor 302 may include a source of hydraulic fluid 308 and a pump 306 for distributing fluid throughout the control system 300. A selective control valve (SCV) 310 may also be located on the tractor 302 for controlling fluid flow between the tractor 302 and the implement 304.

The implement 304 may include a first pair 312 of actuators and a second pair 314 of actuators. The first pair 312 includes a first actuator 316 and a second actuator 318, and the second pair 314 includes a third actuator 320 and a fourth actuator 322. Each of the actuators includes a cap end 324 and a rod end 326, where a piston rod is moved between an extended position and a retracted position within a cylinder base to move hydraulic fluid. The cap ends 324 of the first pair 312 of actuators are fluidly coupled via flow line 328, and the rod ends 326 are coupled via flow line 330. As such, the first and second actuators are fluidly coupled in parallel to each other. Similarly, the cap ends 324 of the second pair 314 of actuators are fluidly coupled via flow line 328, and the rod ends 326 are coupled via flow line 330. The third and fourth actuators are thus fluidly coupled in parallel to one another.

With the parallel fluid coupling between actuators, hydraulic fluid may be shared therebetween to allow the tracks or tires to float or walk as each encounters changes in terrain. It is noted and shown in FIG. 3 that hydraulic fluid is not shared between the first pair 312 and second pair 314 of actuators. Instead, hydraulic fluid that is provided from the tractor 302 may flow through a flow divider 332. In particular, the pump 306 may produce pressurized fluid that flows in a direction indicated by arrow 346 through the SCV 310. As it flows through the SCV 310, the fluid flows along direction 348 to the flow divider 332, which divides the fluid evenly between the two pairs of actuators. Thus, a first portion of fluid flows from the flow divider 332 to the first pair 312 of actuators along flow direction 350, whereas a second portion of fluid flows from the flow divider 332 to the second pair 314 of actuators along flow direction 352. The division of flow by the flow divider 332 allows the implement 304 to remain balanced so neither side lifts faster than the other.

Hydraulic fluid flows to the cap ends of each actuator pair. In other words, the first portion of fluid flows to into the cap end flow line 328 where it enters into the first and second actuators at their respective cap ends. Fluid is able to also fill the rod ends of each actuator to counteract movement of the piston rod to its extended position. As also shown, hydraulic fluid on the rod ends of the first and second actuators is shared via the rod end flow line 330. The same is true with the second pair 314 of actuators where hydraulic fluid is shared between the cap ends of the third actuator 320 and fourth actuator 322 via flow line 328 and between the rod ends of the third actuator 320 and fourth actuator 322 via flow line 330.

The control system 300 of FIG. 3 is an electro-hydraulic control system that may include a first proximity sensor 334 and a second proximity sensor 336. The first proximity sensor 334 may be configured to detect movement of the wheel arm for the respective track or wheel at the first or second actuator. The first proximity sensor 334 may be positioned on the wheel arm. As the first or second actuator moves to an extended position, the first proximity sensor 334 may detect a target or threshold position associated with a transport threshold position. As described above, the transport threshold position may be a predefined limit or restriction on the extension of either the first or second actuator to preclude either from reaching its fully extended position.

As the operator of the implement triggers the implement to fold from its field or plant mode to its transport mode, the first and second actuators extend to raise the implement. As this happens, a target may move towards or in a position where it is detected by the first proximity sensor 334. Once the sensor 334 detects the target, the sensor 334 may generate an output signal to a first relay 336. The first relay 336 may in turn send an output signal to a first electrohydraulic control valve 338 to stop the flow of fluid to the actuators and thus prevent further extension of the first actuator pair 412 before the first actuator pair reaches its fully extended position.

To better understand this, fluid may flow from the rod ends of the first and second actuator via the rod end flow line 330 along fluid direction 354 to the first electrohydraulic control valve 338. The valve may be de-energized in its open position to allow fluid to flow therethrough and along fluid path 356 back to the SCV 310 or source 308. In this configuration, fluid continues to flow into the cap ends of the first pair 312 of actuators. However, when transitioning to the implement transport mode, the first and second actuators extend such that the first sensor 334 detects the target. As a result, the first electrohydraulic control valve 338 may be energized to its closed position, which closes off fluid from flowing through the valve 338. Further, no more fluid can be supplied to the cap end of the actuator pair 312. In effect, this prevents further extension of either actuator from reaching its fully extended position, and thus when different ground features or uneven terrain is encountered, either actuator has some stroke remaining to allow the tracks or wheels to float or walk and therefore allow the load to be more evenly distributed across the tracks or wheels.

The aforementioned target may be adjustable rather than fixed. The target may be a metal plate or other object which is detectable by the proximity sensor. Moreover, the electrohydraulic valve 338 is not operably controllable via a controller or control logic in this embodiment. Instead, a proximity sensor, switch (e.g., on/off switch), or other sensor may provide feedback regarding an extension position of the actuator pair. Further, there may be a sensor for each actuator in the pair. Thus, the first proximity sensor 334 may actually comprise a pair of sensors, e.g., one for the first actuator 316 and another for the second actuator 318. As for the position of the respective actuator, the sensor may be capable of detecting a percentage of extension (e.g., the actuator is 90% extended). In other words, the targets are placed such that the sensor can detect them prior to full extension of the actuator pair, thus allowing for the remaining stroke required to allow the pair to float or walk.

The same may also be true of the second actuator pair 314. A second proximity sensor 340 may detect a target associated with a position of the third and fourth actuators, and once the target is detected the sensor 340 may send an output signal to a second relay 342. The second relay 342 may in turn send an output signal to a second electrohydraulic valve 344 to stop fluid flow to the cap ends of the third actuator 320 and fourth actuator 322.

During operation, fluid at the rod ends of the second actuator pair 314 may flow along flow direction 358 to the second electrohydraulic valve 344. The valve 344 may be de-energized in its open position to allow fluid to flow therethrough and along flow direction 360 to the SCV 310 or source 308. It is likewise possible in an alternative embodiment that the valve 344 may be normally energized in its open position instead of being de-energized. In either case, when the sensor 340 detects the target, the second electrohydraulic valve 344 may be actuated to its closed position to prevent further flow therethrough. As the valve 344 closes, the flow of fluid to the cap ends of the second actuator pair 314 stops and the extension of the actuators also stops before reaching their fully extended position.

In the embodiment of FIG. 3, it is understood that the first electrohydraulic valve 338 and the second electrohydraulic valve 344 may be controlled independently from one another. Thus, fluid flow through the two pairs of actuators may be controlled independently. Moreover, while only two pairs of actuators are shown, the present disclosure is not limited to only two pairs of actuators. Additional pairs of actuators may be provided for implements which are wider or require more tracks or tires.

Figure 4:
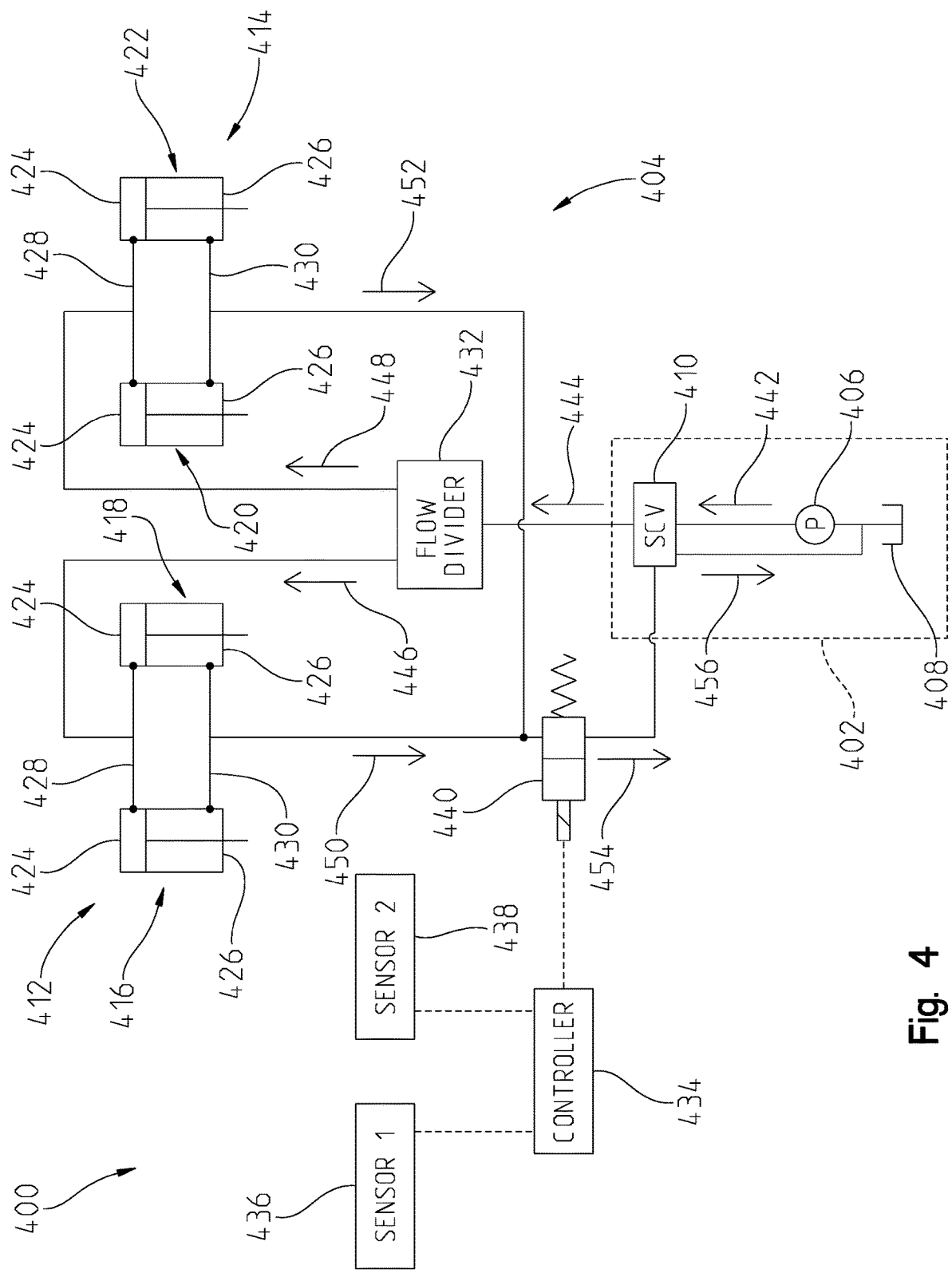
FIG. 4 is a schematic of a second control system for distributing weight across an agricultural implement.

Referring now to FIG. 4, another embodiment is disclosed of a control system for allowing all tracks or tires to contact the ground during transport. This control system 400 also ensures that the actuators that lower the tracks or tires do not fully extend when the implement is configured in its transport mode or configuration. Here, the control system 400 may be similar to the one in FIG. 3 such that it includes a first portion located on a tractor 402 or towing vehicle and a second portion located on an agricultural implement 404. The tractor 402 may include a source of hydraulic fluid 408 and a pump 406 for distributing fluid throughout the control system 400. A selective control valve (SCV) 410 may also be located on the tractor 402 for controlling fluid flow between the tractor 402 and the implement 404.

The implement 404 may include a first pair 412 of actuators and a second pair 414 of actuators. The first pair 412 includes a first actuator 416 and a second actuator 418, and the second pair 414 includes a third actuator 420 and a fourth actuator 422. Each of the actuators includes a cap end 424 and a rod end 426, where a piston rod is moved between an extended position and a retracted position within a cylinder base to move hydraulic fluid. The cap ends 424 of the first pair 412 of actuators are fluidly coupled via flow line 428, and the rod ends 426 are fluidly coupled via flow line 430. As such, the first and second actuators are fluidly coupled in parallel to each other. Similarly, the cap ends 424 of the second pair 414 of actuators are fluidly coupled via flow line 428, and the rod ends 426 are coupled via flow line 430. The third and fourth actuators are thus fluidly coupled in parallel to one another.

With the parallel fluid coupling between actuators, hydraulic fluid may be shared therebetween to allow the tracks or tires to float or walk as each encounters changes in terrain. It is shown in FIG. 4 that hydraulic fluid is not shared between the first pair 412 and second pair 414 of actuators. Instead, hydraulic fluid that is provided from the tractor 402 may flow through a flow divider 432. In particular, the pump 406 may produce pressurized fluid that flows in a direction indicated by arrow 442 through the SCV 410. As it flows through the SCV 410, the fluid flows along direction 444 to the flow divider 432, which divides the fluid evenly between the two pairs of actuators. Thus, a first portion of fluid flows from the flow divider 432 to the first pair 412 of actuators along flow direction 446, whereas a second portion of fluid flows from the flow divider 432 to the second pair 414 of actuators along flow direction 448. The division of flow by the flow divider 432 allows the implement 404 to remain balanced so neither side lifts faster than the other.

Hydraulic fluid flows to the cap ends of each actuator pair. In other words, the first portion of fluid flows to into the cap end flow line 428 where it enters into the first and second actuators at their respective cap ends. Fluid is able to also fill the rod ends of each actuator to counteract movement of the piston rod to its extended position. As also shown, hydraulic fluid on the rod ends of the first and second actuators is shared via the rod end flow line 430. The same is true with the second pair 414 of actuators where hydraulic fluid is shared between the cap ends of the third actuator 420 and fourth actuator 422 via flow line 428 and between the rod ends of the third actuator 420 and fourth actuator 422 via flow line 430.

In this control system 400, electrical over hydraulic control may be implemented over the controlled movement of the different actuator pairs. Here, the implement 404 is controlled in such a way that the actuators are stopped before they reach their fully extended position to allow fluid to flow back and forth between actuators in each pair. This control may be done via software or control logic stored within a controller 434 or control unit. The controller 434 may include a memory unit that is capable of storing software or control logic for controlling the flow of fluid through the system 400. Further, the controller 434 may include a processor capable of executing the software or control logic to ensure the actuators do not reach their fully extended positions as the implement is transitioned to its transport mode, thereby allowing the actuators to float or walk when necessary to substantially balance pressures within each actuator. Moreover, in another embodiment, a pressure balancing circuit may also be employed.

In this system 400, a first sensor 436 and a second sensor 438 may be provided. Each sensor may be a height sensor configured as a rotary potentiometer that is calibrated to determine the plant or field mode/position and transport mode/position of the implement. Alternatively, the sensors 436, 438 may be position sensors located in each actuator for detecting actuator position. Further, the sensors 436, 438 may detect ground height defined between the chassis and the ground. In any event, the sensors 436, 438 may be in electrical communication with the controller 434 to send output signals thereto in response to detected positions of the actuator or ground height.

In the embodiment of FIG. 4, there are two height sensors shown. Each height sensor corresponds to one of the actuator pairs. In other embodiments, however, there may be additional height or positions sensors. In one aspect, there may be a sensor for every actuator.

The software or control logic may include predefined target or threshold positions associated to an extension position of the actuators that is less than the fully extended position. In other words, the software or control logic may have predefined targets or thresholds for stopping the implement as it moves to its transport mode position before the actuator pairs are fully extended.

The control system 400 may include a control valve 440 disposed in electrical communication with the controller 434, and fluidly coupled in the system to prevent flow to the cap ends of the actuator pairs. When the control valve 440, which may be an electrohydraulic control valve, is de-energized, hydraulic fluid may flow therethrough. In this position, fluid may flow from the first actuator pair 412 along flow path 450 through the valve 440 and fluid may also flow from the second actuator pair 414 along flow path 452 through the valve 440. As fluid flows through the valve 440, it may return along path 454 to the SCV 410 or the source 408 via flow path 456, as shown in FIG. 4.

When an operator enables software or control logic to fold the implement from its plant or field mode to its transport mode, the controller 434 may receive input from the sensors as each actuator pair approaches the target height or position. As this happens, the controller 434 may actuate the control valve 440 from its open position to its closed position, thereby limiting the actuators to a position which is less than their fully extended position. As this is done, each actuator has remaining stroke or extension available to allow the tracks or tires to float or walk and thus achieve equal or balanced pressures in the actuators.

The present disclosure therefore provides several embodiments for controlling actuator extension as an implement is transitioned to its transport mode. The inputs in each embodiment may be variable and include switches, height sensors, proximity sensors, position sensors, height-to-ground sensors and the like. There may be multiple inputs and outputs including, but not limited to, electrohydraulic control valves for stopping fluid flow before each actuator pair reaches their respective fully extended position. Moreover, the input device does not dictate the output device.

The method of sensing is one aspect of each control system, but each control system also may include its own independent manner in which it controls the control valve for limiting implement movement.

In an alternative embodiment, it may be possible to control the SCV on the tractor or towing vehicle. The software or control logic for implement control may also allow for selective control over the SCV. When the SCV is open, fluid may flow from the tractor to the implement. However, when the SCV is closed, the flow of fluid to the implement and thus the actuator pairs may be disabled. Other valves on the tractor or implement may be utilized to control fluid flow to the actuator pairs as well.

Moreover, in the embodiments of FIGS. 3 and 4, the control systems are arranged such that fluid flows from the tractor to the cap ends of both actuator pairs. In other embodiments, this may be reversed where fluid is supplied from the tractor to the rod ends of the actuator pairs. In this case, the control valves may be positioned in fluid communication with the cap ends of each actuator pair rather than the rod ends.

In addition, the present disclosure presents embodiments in which the actuators are kept from reaching their fully extended position as the implement is configured in its transport mode. However, the same principles and teachings may also apply when the implement is in its field or plant mode. As fields can often include uneven terrain, the capability of allowing the lift actuators to float or walk during plant mode may be employed, as necessary. In some embodiments, a user may enable or disable the control logic or software during plant mode.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A control system for controlling an implement that is movable between a work mode and a transport mode, the control system comprising:
   a source of hydraulic fluid;
   a first actuator fluidly coupled to the source, the first actuator being movable between a retracted position and a fully extended position;
   a second actuator fluidly coupled to the source and in parallel with the first actuator, the second actuator being movable between a retracted position and a fully extended position;
   a sensor configured for detecting a change in position of the first or second actuator between their retracted and fully extended positions;
   a control valve disposed in communication with the sensor and in fluid communication with the first and second actuators; and
   a controller comprising control logic including a predefined threshold extended position, the controller configured to, as the implement is folded from its work mode to its transport mode, compare the change in position outputted by the sensor to the predefined threshold extended position, the controller further configured to trigger the control valve to inhibit flow of hydraulic fluid to, when the change in position reaches the predefined threshold extended position, the first and second actuators, the redefined threshold extended position being before either actuator reaches its fully extended position and at a predefined partially extended location at which an amount of a stroke remains to allow the first and second actuators to float or walk while the implement is in the transport mode.

2. The control system of claim 1, wherein:
the first actuator comprises a cap end and a rod end;
the second actuator comprises a cap end and a rod end;
wherein, the cap ends of the first and second actuators are directly fluidly coupled, and the rod ends of the first and second actuators are directly fluidly coupled.

3. The control system of claim 1, wherein the sensor is configured to detect a target on the implement as the first and second actuators move towards their fully extended positions.

4. The control system of claim 3, wherein in response to detection of the target by the sensor, the system is configured to generate an output signal to trigger the control valve to block fluid therethrough and inhibit movement of the first and second actuators.

5. The control system of claim 1, wherein, in the transport mode, the first and second actuators are disposed at the predefined threshold extended position which is less than their fully extended positions;
further wherein, when in the transport mode, hydraulic fluid can flows between the first and second actuators such that the first or second actuator extends as the other retracts.

6. The control system of claim 1, further comprising:
a third actuator fluidly coupled to the source, the third actuator being movable between a retracted position and a fully extended position;
a fourth actuator fluidly coupled to the source and in parallel with the third actuator, the fourth actuator being movable between a retracted position and a fully extended position;
a second sensor for detecting a change in position of the third or fourth actuator between their retracted and fully extended positions; and
a second control valve disposed in communication with the second sensor and in fluid communication with the third and fourth actuators;
wherein, as the implement moves to its transport mode, the second sensor is configured to detects the third and fourth actuators moving towards their fully extended positions;
wherein, in response to the implement being moved to the transport mode, the second control valve is configured to inhibit movement of the third and fourth actuators before either actuator reaches its fully extended position and at a predefined partially extended position at which an amount of a stroke remains to allow the third and fourth actuators to float or walk.

7. The control system of claim 6, wherein the first and second actuators form a first actuator pair and the third and fourth actuators form a second actuator pair, the first actuator pair and second actuator pair being independently fluidly coupled to the source.

8. The control system of claim 7, further comprising a flow divider fluidly coupled between the source and the first and second actuator pairs, the flow divider configured to divide an amount of fluid from the source into substantially equal first and second portions, the first portion of fluid flowing to the first actuator pair and the second portion of fluid flowing to the second actuator pair.

9. A control system for controlling an implement having a chassis that is movable between a work mode, at which the implement is configured to operate, and a transport mode, at which the implement is folded to be transported along a ground surface, the control system comprising:
a controller comprising control logic for controlling the control system, the control logic including a predefined target height;
a source of hydraulic fluid;
a first actuator fluidly coupled to the source, the first actuator being movable between a retracted position and a fully extended position;
a second actuator fluidly coupled to the source and in parallel with the first actuator, the second actuator being movable between a retracted position and a fully extended position;
a sensor configured for detecting a change in height of the chassis as the first and second actuators move between their retracted and fully extended positions, the sensor being in communication with the controller; and
a control valve disposed in communication with the controller and in fluid communication with the first and second actuators;
wherein, as the implement moves to its transport mode, the sensor is configured to detects a height of the chassis relative to the ground surface and output the detected height to the controller;
wherein, in response to being moved to its transport mode, the controller is configured to use the control logic to compare the detected height to the predefined target height;
wherein, when the height of the chassis reaches the predefined target height as the implement is folded to the transport mode, the controller is configured to trigger the control valve to inhibit movement of the first and second actuators before either actuator reaches its fully extended position.

10. The control system of claim 9, wherein:
the first actuator comprises a cap end and a rod end;
the second actuator comprises a cap end and a rod end;
wherein, the cap ends of the first and second actuators are directly fluidly coupled, and the rod ends of the first and second actuators are directly fluidly coupled.

11. The control system of claim 9, wherein, in the transport mode, the first and second actuators are disposed at a target extended position which is less than their fully extended positions;
further wherein, during transport mode, hydraulic fluid can flow between the first and second actuators such that the first or second actuator extends as the other retracts.

12. The control system of claim 9, further comprising:
a third actuator fluidly coupled to the source, the third actuator being movable between a retracted position and a fully extended position;
a fourth actuator fluidly coupled to the source and in parallel with the third actuator, the fourth actuator being movable between a retracted position and a fully extended position;
a second sensor configured for detecting a change in height of the chassis as the third and fourth actuators move between their retracted and fully extended positions, the second sensor being in communication with the controller; and
a second control valve disposed in communication with the controller and in fluid communication with the third and fourth actuators;
wherein, as the implement moves to its transport mode, the second sensor is configured to detect the height of the chassis relative to the ground surface and output the detected height to the controller;

wherein, the controller is configured to use the control logic to compare the detected height to the predefined target height;

wherein, when the height of the chassis reaches the predefined target height, the controller is configured to trigger the second control valve to inhibit movement of the third and fourth actuators before either actuator reaches its fully extended position.

13. The control system of claim 12, wherein the first and second actuators form a first actuator pair and the third and fourth actuators form a second actuator pair, the first actuator pair and second actuator pair being independently fluidly coupled to the source.

14. The control system of claim 13, further comprising a flow divider fluidly coupled between the source and the first and second actuator pairs, the flow divider configured to divide an amount of fluid from the source into substantially equal first and second portions, the first portion of fluid to flow to the first actuator pair and the second portion of fluid to flow to the second actuator pair.

15. The control system of claim 9, further comprising a selective control valve fluidly coupled to the first and second actuators, the selective control valve configured to supply fluid to the first and second actuators;

wherein, when the height of the chassis reaches the predefined target height, the controller is configured to trigger the selective control valve to discontinue the supply of fluid to the first and second actuators and inhibit movement of the first and second actuators before either actuator reaches its fully extended position.

16. An agricultural implement configured to operate in at least a work mode, at which the agricultural implement is in a planting configuration, and a transport mode, at which the agricultural implement is in a transport configuration as it traverses along a ground surface, the implement comprising:
   a chassis;
   a first ground-engaging mechanism and a second ground-engaging mechanism coupled to the chassis;
   a source of hydraulic fluid;
   a first actuator fluidly coupled to the source and being movable between a retracted position and a fully extended position, the first actuator configured to move the first ground-engaging mechanism between a lowered position and raised position;
   a second actuator fluidly coupled to the source and in parallel with the first actuator, the second actuator being movable between a retracted position and a fully extended position, where the second actuator is configured to move the second ground-engaging mechanism between a lowered position and raised position;
   a sensor configured to detect a height of the chassis relative to the ground surface or movement of the first and second actuators;
   a control valve fluidly coupled with the first and second actuators;
   wherein, as the implement moves from the work mode to its transport mode, the sensor is configured to detect the height of the chassis or movement of the first and second actuators towards their fully extended positions;
   wherein, in response to the implement being moved from the work mode to the transport mode, the control valve is configured to inhibit movement of the first and second actuators before either actuator reaches its fully extended position.

17. The implement of claim 16, wherein, in the transport mode, the first and second actuators are disposed at a target extended position which is less than their fully extended positions;
   further wherein:
   in transport mode, as the first ground-engaging mechanism raises, the first actuator is configured to extend such that hydraulic fluid flows from the second actuator to the first actuator to induce the second actuator to retract; and
   in transport mode, as the second ground-engaging mechanism raises, the second actuator is configured to extend such that hydraulic fluid flows from the first actuator to the second actuator to induce the first actuator to retract.

18. The implement of claim 16, wherein:
   the first actuator comprises a cap end and a rod end;
   the second actuator comprises a cap end and a rod end;
   wherein, the cap ends of the first and second actuators are directly fluidly coupled, and the rod ends of the first and second actuators are directly fluidly coupled.

19. The implement of claim 16, further comprising a selective control valve located on a towing vehicle and fluidly coupled between the source and the first and second actuators, wherein the selective control valve is positioned to supply hydraulic fluid from the source to the first and second actuators when in its open position;
   further wherein, the selective control valve is moveable to its closed position when the sensor detects the chassis height or the positions of the actuators reaches a target to further inhibit movement of the first and second actuators before either actuator reaches its fully extended position.

20. The implement of claim 16, further comprising:
   a third actuator fluidly coupled to the source, the third actuator being movable between a retracted position and a fully extended position;
   a fourth actuator fluidly coupled to the source and in parallel with the third actuator, the fourth actuator being movable between a retracted position and a fully extended position;
   wherein the first and second actuators form a first actuator pair and the third and fourth actuators form a second actuator pair, the first actuator pair and second actuator pair being independently fluidly coupled to the source.

* * * * *